Feb. 22, 1966   J. R. L. MOLLER   3,236,088
METHOD AND APPARATUS FOR MAKING CUP-SHAPED
ARTICLES AND THE LIKE
Filed Jan. 5, 1962   5 Sheets-Sheet 1

INVENTOR.
JENS R. L. MOLLER
BY Glenn, Palmer
& Matthews
HIS ATTORNEYS

United States Patent Office 3,236,088
Patented Feb. 22, 1966

3,236,088
METHOD AND APPARATUS FOR MAKING CUP-SHAPED ARTICLES AND THE LIKE
Jens R. L. Moller, Henrico County, Va., assignor to Reynolds Metals Company, Richmond, Va., a corporation of Delaware
Filed Jan. 5, 1962, Ser. No. 164,485
19 Claims. (Cl. 72—328)

This invention relates to improved apparatus and methods for making drawn or stamped articles, such as cup-shaped receptacles and the like. This invention also relates to improved fluid actuating systems for such apparatus or the like.

It is well known in the art that double-acting die apparatus has been provided for drawing a blank of material between a male die member and a female die member which move toward each other to shape the blank of material disposed therebetween into the desired configuration. In this manner, the blank of material can be drawn into a relatively deep cup-shaped configuration with relatively short die member movement as compared to the die movement required when only one of the die members is moved relative to the other die member to draw blank material into a similar configuration.

Therefore, the apparatus required for producing the double die movement is relatively smaller than the apparatus required for producing a single die movement to form like articles whereby the double-acting die apparatus is less expensive than the single-acting die apparatus and requires less production space.

Generally, the double-acting die apparatus for forming a cup-shaped article from a substantially flat blank of material comprises a movable male die member that is receivable in a cavity of a movable female die member which moves toward the male die member and co-operates with a third movable die member to hold the peripheral edge of the blank of material therebetween and carry the same about the male die member. While the female die member and the third movable die member carry the blank of material about the male die member, the moving third die member causes movement of the male die member into the cavity of the female die member moving toward the male die member to draw the blank of material into a cup-shaped configuration.

This movement of the male die member by the movement of the third die member is normally accomplished by fluid means.

In particular, the male die member and the third die member have piston portions closing off one end of a cylinder containing a suitable fluid. When the third die member is moved in one direction relative to the male die member by the female die member moving toward the male die member, the piston portion thereof displaces the fluid in the cylinder and causes the displaced fluid to act on the piston portion of the male die member and move the male die member toward the female die member and into the cavity thereof to draw the blank of material into a cup-shaped configuration.

It has been found, however, that these prior known double-acting die apparatus do not produce uniform articles during continued use of the apparatus because the fluid in the cylinder tends to progressively expand through subsequent heating thereof and causes the apparatus to produce progressively deeper cup-shaped articles. Therefore, because the fluid expands and contracts, the strokes of the male die members into the cavities of the female die members cannot be controlled.

Accordingly, these prior-known double-acting die apparatus cannot emboss the closed ends of the drawn cup-shaped articles produced thereby because there is no way to control the strokes of the male die members relative to the ends of the cavities in the female die members. Thus, additional apparatus and operations must be provided to emboss the closed ends of the cup-shaped articles produced by the prior-known double-acting die apparatus.

Further, no means are provided by these prior-known double-acting die apparatus to trim the subsequently wrinkled peripheral edges of the drawn cup-shaped articles produced thereby, whereby a subsequent trimming operation must be provided.

However, according to the teachings of this invention, an improved double-acting die apparatus and method are provided whereby uniform cup-shaped articles are continuously produced and have the closed ends thereof embossed during the drawing operation. Further, the drawn cup-shaped articles are trimmed by the apparatus of this invention.

In this manner, not only are improved articles produced, but the articles are produced at less expense than by prior-known methods and apparatus because fewer production steps are required by the apparatus and methods of this invention.

One embodiment of this invention accomplishes the above features by having means for maintaining a constant volume of fluid in the cylinder of the die apparatus whereby the stroke of the male die member into the cavity of the female die member remains the same throughout any operating conditions of the apparatus.

In addition, the apparatus of this invention has improved means for reducing or substantially eliminating wrinkles at the open end of the cup-shaped articles produced thereby and has improved means for holding the blank of material from which the articles are subsequently produced.

Accordingly, one of the objects of this invention is to provide an improved apparatus having one or more of the novel features of this invention set forth above or hereinafter shown or described.

Another object of this invention is to provide an improved system for actuating such an apparatus or the like.

Another object of this invention is to provide an improved method for making a cup-shaped article or the like.

A further object of this invention is to provide an improved article produced by such a method or the like.

Other objects, uses and advantages of this invention are apparent from a reading of this description, which proceeds with reference to the accompanying drawings forming a part thereof and wherein:

FIGURE 1 is a schematic, perspective view illustrating one method and apparatus of this invention for continuously forming a plurality of cup-shaped articles or the like.

While the methods and apparatus of this invention are hereinafter described as being particularly adaptable for forming cup-shaped receptacles, such as food containers and the like, it is to be understood that the methods and apparatus of this invention can be utilized for forming articles having any desired configuration.

Therefore, the appended claims are not to be limited to only the embodiments illustrated in the drawings, because the drawings are merely utilized to illustrate one of the wide variety of applications of this invention.

Figure 1:
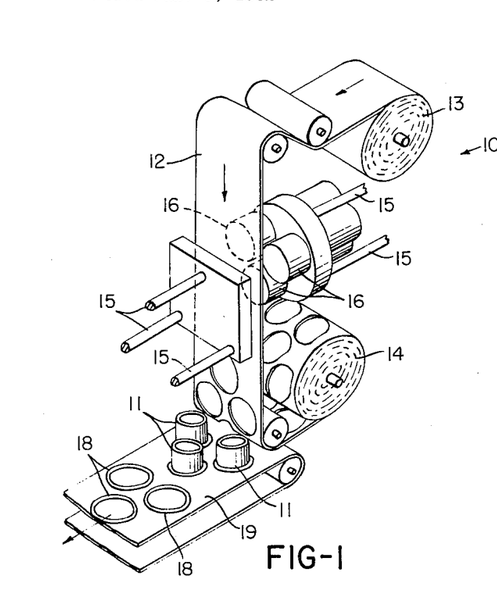
Figure 2:
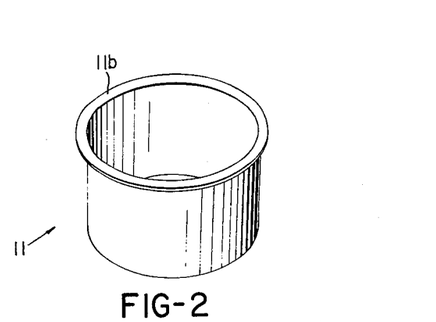
FIGURE 2 is an enlarged, perespective view illustrating an article produced by the method and apparatus of FIGURE 1.
Figure 3:
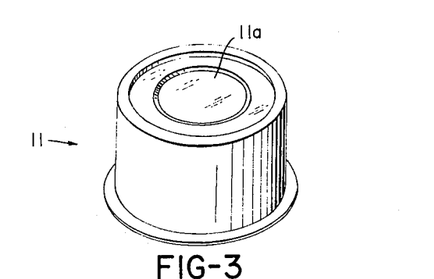
FIGURE 3 is a bottom, perspective view of the article illustrated in FIGURE 2.

Referring now to FIGURE 1, an improved apparatus of this invention is generally indicated by the reference numeral 10 and is adapted to form a plurality of cup-shaped receptacles 11 from a sheet 12 of suitable blank material being drawn from a supply roll 13 through the apparatus 10 by a driven wind-up roll 14.

While the apparatus 10 is illustrated in FIGURE 1 as being supported in the horizontal position by a plurality of support members or means 15, it is to be understood that the apparatus 10 can be disposed in any position relative to earth, as desired.

Further, while the apparatus 10 is illustrated in FIGURE 1 as being formed from three die units 16 to simultaneously form three cup-shaped articles 11 for each drawing operation thereof, it is to be understood that the apparatus 10 can comprise one or more die units 16 as illustrated in FIGURES 4–9, as desired.

Figure 6:
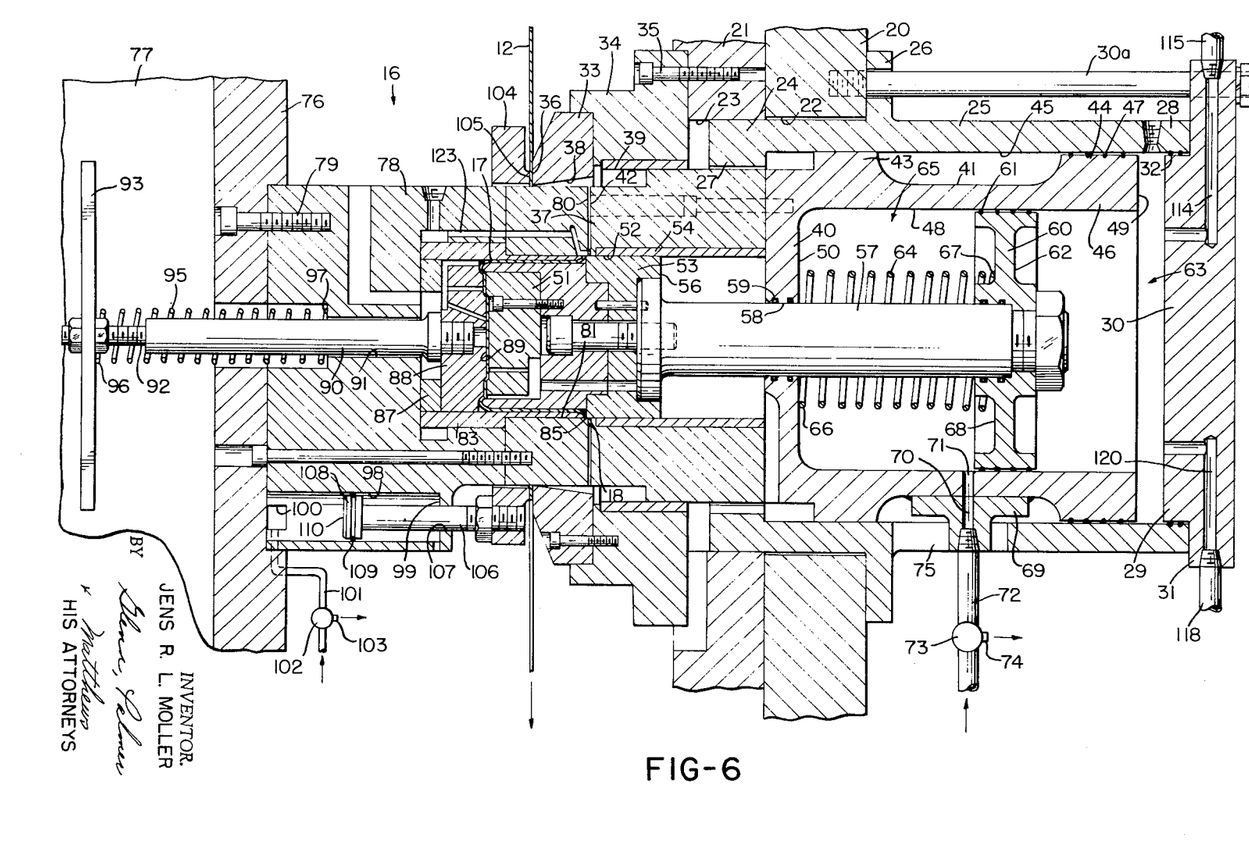
FIGURE 6 is a view similar to FIGURE 4 and illustrates the apparatus of FIGURE 4 in another of its operating positions.
Figures 8, 9:
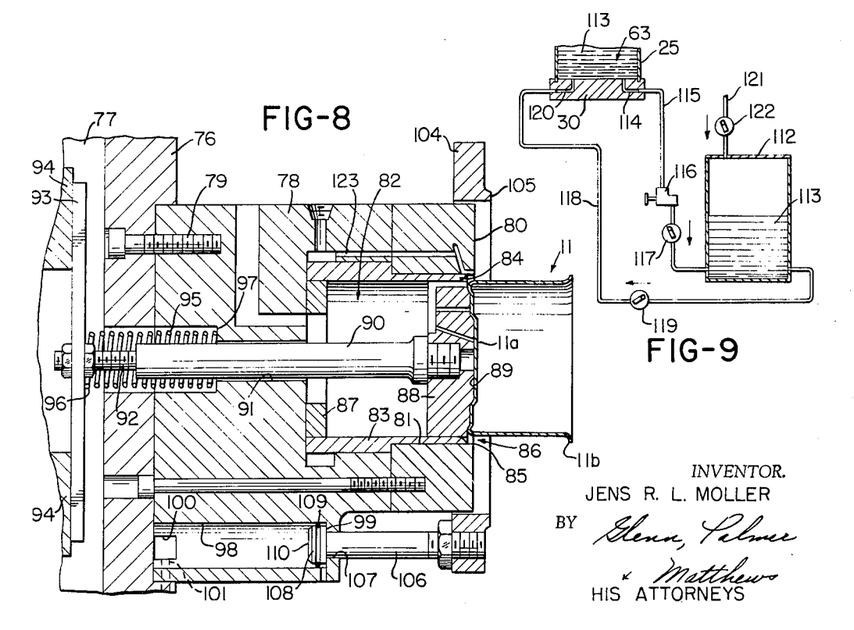
FIGURE 8 is a fragmentary, cross-sectional view of the apparatus illustrated in FIGURE 4 and illustrates the method of ejecting a completed article formed thereby.
FIGURE 9 is a schematic view illustrating the hydraulic system of this invention for the apparatus of FIGURE 4.

Each die unit 16 of the apparatus 10 is adapted to cut a circular blank 17, FIGURE 6, from the strip 12 of blank material, when the strip 12 has been indexed to a new position relative to the apparatus 10 in a manner well known in the art, and, thereafter, draw the blank 17 into a cup-shaped configuration, as illustrated in FIGURES 6 and 8, and trim an annular peripheral ring 18 from the drawn blank 17 to form the completed article 11.

Since the apparatus 10 is disposed in the horizontal position as illustrated in FIGURE 1, the drawn articles 11 and trimmed annular rings 18 formed thereby are adapted to drop by gravity from the apparatus 10 to any suitable conveyor means, such as belt 19, and be conveyed thereby to any desired location. After the apparatus 10 has formed three articles 11, the strip 12 of blank material is indexed to a new position relative to the apparatus 10 and stopped so that the apparatus 10 can form three more articles 11 therefrom in a like manner.

Since each of the die units 16 of the apparatus 10 illustrated in FIGURE 1 is similar and operates in a like manner, only a single die unit 16 is illustrated in the remaining figures of the drawings.

Figure 4:
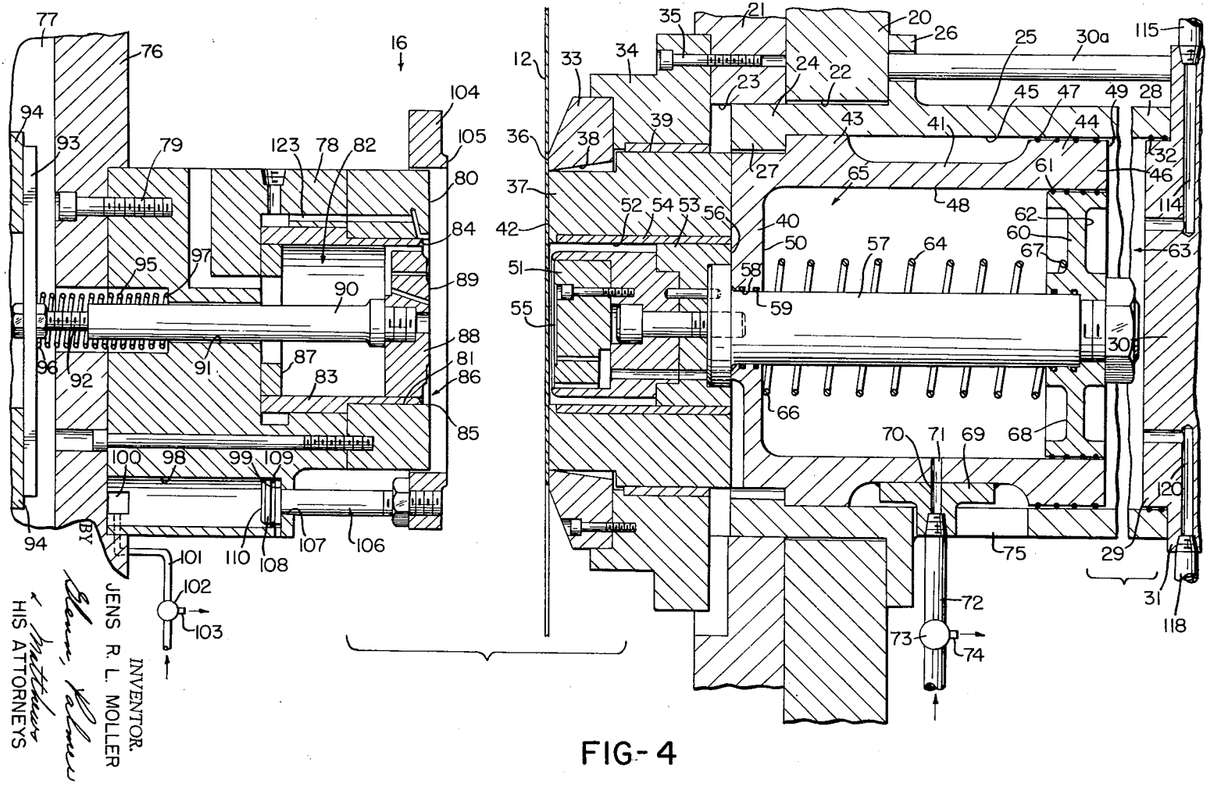
FIGURE 4 is a cross-sectional view illustrating one embodiment of the apparatus of this invention in one of the operating positions thereof.

Referring now to FIGURE 4, the die unit 16 includes a stationary bolster 20 carried by the support means 15 previously described, or any other desired supporting structure. The bolster 20 carries a die holder 21 on one side thereof, the bolster 20 and die holder 21 respectively having aligned bores 22 and 23 passing therethrough and receiving an end 24 of a tubular cylinder-defining member 25 projecting from the other side of the bolster 20.

The cylinder-defining member 25 has an annular flange 26 abutted against the bolster 20 to properly position the cylinder-defining member 25 relative to the bolster 20.

The cylinder-defining member 25 has an inturned flange 27 at the end 24 thereof to provide a stop means in a manner hereinafter described. The other end 28 of the cylinder-defining member 25 telescopically receives a body portion 29 of an end plate 30, the end plate 30 having an outwardly directed annular flange 31 abutting the end 28 of the cylinder-defining member 25, whereby the end plate 30 effectively closes off the end 28 of the cylinder-defining member 25. If desired, suitable sealing means, such as "O" rings 32 can be disposed between the mating portions of the cylinder-defining member 25 and the end plate 30, as illustrated in the drawings, to provide a fluid-tight seal between the members 25 and 30.

The cylinder-defining member 25 is secured to the bolster 20 in any suitable manner, and, in the embodiment illustrated in the drawings, suitable bolts 30a pass through the annular flange 31 of the end plate 30 and the annular flange 26 of the cylinder-defining member 25 and are threadedly received in the bolster 20, whereby the bolts 30a compact the end plate 30 against the cylinder-defining member 25 and the cylinder-defining member 25 against the bolster 20.

An annular holding member 33 is carried by an annular plate 34 secured to the die holder 21 in any suitable manner, such as by bolts 35 or the like, the annular holding member 33 having a flat outer surface 36 adapted to support the blank material 12 in a manner hereinafter described.

An annular movable die member 37 is disposed in bores 38 and 39 passing respectively through the annular holding member 33 and the annular plate 34 and is secured to a closed end 40 of a piston member 41 disposed in the cylinder-defining member 25 for a purpose hereinafter described, the movable die member 37 having an outer flat surface 42 normally disposed in the same plane as the plane of the flat surface 36 of the annular holding member 33 when the die apparatus 16 is in the position illustrated in FIGURE 4.

The bore 39 in the annular plate 34 is suitably lined with bearing material, as illustrated in the drawings.

The piston 41, connected to the movable die member 37, has a pair of outwardly directed, spaced annular shoulders 43 and 44 respectively disposed in sliding engagement with the internal peripheral surface 45 of the cylinder-defining member 25, the shoulder 44 being disposed at the end 46 of the piston 41 and being disposed in sliding and sealing engagement with the internal peripheral surface 45 of the cylinder-defining member 25 by carrying suitable sealing means, such as O rings 47 or the like.

The annular shoulder 43 of the piston 41 is adapted to abut the stop means or flange 27 of the cylinder-defining member 25 when the surface 42 of the movable die member 37 is disposed in the same plane as the plane of the surface 36 of the holding member 33 in the manner illustrated in FIGURE 4.

The piston 41 has a bore 48 interrupting the end surface 49 thereof and terminating at an end wall 50 of the closed end 40 thereof for a purpose hereinafter described.

A movable male die member 51 is disposed in the bore 52 of the annular die member 37 and has an outwardly directed flange 53 at one end thereof disposed in sliding engagement with the movable die member 37, the annular flange 53 of the male die member 51 being utilized for a trimming operation in a manner hereinafter described. If desired, the bore 52 of the movable die member 37 can be lined with a suitable bushing 54, such as a bronze bushing or the like, to facilitate ease of relative movement between the die members 37 and 51 and prevent excessive wear therebetween.

The male die member 51 has an embossing face 55 provided with any desired configuration for embossing the closed end 11a of the cup-shaped article 11 in a manner hereinafter described.

The other end 56 of the male die member 51 is adapted to abut the closed end 40 of the piston 41 when the piston 41 and male die member 51 are disposed in the position illustrated in FIGURE 4, the outermost points on the embossing face 55 of the male die member 51 preferably being disposed substantially in the same plane as the planes of the outer surfaces 42 and 36 of the members 37 and 33 when the male die member 51 is in the position illustrated in FIGURE 4.

A shaft or rod 57 is interconnected to the end 56 of the male die member 51 and projects through a bore 58 passing centrally through the closed end 40 of the piston 41, the rod 57 being disposed in sealing engagement with the closed end 40 of the piston 41 by suitable sealing means, such as O rings 59 or the like carried by the piston 41.

The rod 57 carries a piston 60 on the free end thereof which is disposed in the bore 48 of the piston 41 and is disposed in sliding and sealing engagement therewith by suitable sealing means, such as O rings 61 or the like carried by the piston 60, as illustrated in FIGURE 4.

The end surface 62 of the piston 60 cooperates with the end surface 49 of the piston 41 to define a chamber 63 in the cylinder-defining member 25, the chamber 63 being filled with a suitable fluid, such as hydraulic oil or the like, whereby movement of the piston 41 toward the end plate 30 causes the thus displaced fluid in the chamber 63 to act on the end surface 62 of the piston 60 and thereby move the piston 60 away from the end plate 30.

Thus, it can be seen that when the movable die member 37 is moved to the right, in FIGURE 4, in a manner hereinafter described, the piston 41 also moves to the right, causing movement of the piston 60 to the left, whereby the male die member 51 interconnected thereto also moves to the left.

In order to normally maintain the die members 37 and 51 in the position illustrated in FIGURE 4, a suitable compression spring 64 is disposed in a chamber 65 defined in the bore 48 of the piston 41 and has one end 66 thereof bearing against the end wall 50 of the piston 41 and the other end 67 thereof bearing against the end surface 68 of the piston 60.

In this manner, the force of the compression spring 64 tends to move the piston 60 to the right, as viewed in FIGURE 4, whereby the end surface 62 of the piston 60 acts against the hydraulic fluid in the chamber 63 to cause the hydraulic fluid to act against the end surface 49 of the piston 41 and move the same to the left.

However, further movement of the piston 60 to the right from the position illustrated in FIGURE 4 is prevented by the end surface 56 of the male die member 51 abutting the closed end 40 of the piston 41 and also because the flange 43 of the piston 41 abuts the stop means or flange 27 of the cylinder-defining means 25.

Therefore, the die members 37 and 51 are normally held in the position illustrated in FIGURE 4 by the compression spring 64.

While the spring 64 is sufficient to return the die members 37 and 51 to the position illustrated in FIGURE 4 after the die unit 16 has performed a drawing operation in a manner hereinafter described, it has been found that the force of the compression spring 64 is not sufficient to prevent wrinkles in the cup-shaped article 11 drawn by the apparatus 16. Therefore, the chamber 65 of the apparatus 16 is adapted to receive fluid under pressure so that the pressurized fluid in the chamber 65 will act against the end surface 68 of the piston 60 and tend to move the same to the right in the same manner that the spring 64 is tending to move the piston 60 to the right.

One means for supplying pressurized fluid to the chamber 65 comprises a key-like member 69 welded or otherwise secured to the piston 41 between the flanges 43 and 44 thereof and having a bore 70 passing therethrough and aligned with a bore 71 passing through the piston 41 and leading to the chamber 65. A suitable flexible conduit means 72 is interconnected to the bore 70 of the key-like member 69 and has a regulator valve 73 disposed therein whereby the valve 73 delivers fluid under pressure to the chamber 65 as long as the pressure in the chamber 65 remains below a predetermined value. When the pressure in the chamber 65 increases above the predetermined pressure value, the valve 73 expels some of the fluid from the chamber 65 through an outlet conduit means 74 in a manner well known in the art whereby the pressure value of the fluid in the chamber 65 is prevented from exceeding a predetermined pressure value.

In this manner, the fluid pressure in the chamber 65 is maintained at a predetermined pressure value by the pressure regulator valve 73 for a purpose hereinafter described.

The key-like member 70 and flexible conduit 72 interconnected thereto are adapted to be moved by the piston 41 relative to the cylinder-defining member 25 because the key-like member 40 and conduit 72 pass through a suitable slot 75 formed in the cylinder-defining member 25 as illustrated in FIGURE 4.

Another die holder 76 is carried by the support means 15 of the apparatus 10 and is movable relative thereto in a manner well known in the art, the die holder 76 being suitably interconnected to a press ram 77 of the apparatus 10 whereby the die holder 76 is adapted to be moved toward and away from the bolster 20 by the press ram 77 in a manner well known in the art.

A female die member 78 is carried by the die holder 76 and is secured thereto by bolts 79 or the like, the female die member 78 being formed from a single member or a plurality of members as illustrated.

The female die member 78 has a flat end surface 80 interrupted by a bore 81 to define a cavity 82 in the die member 78. An annular insert 83 is disposed in the cavity 82 of the female die member 78 and has an outer end 84 inwardly offset from the inner edge 85 of the flat surface 80 of the female die member 78 to define a channel 86, the end 84 of the sleeve 83 having an arcuate surface or the like to form an appropriately shaped outer peripheral flange 11b on the cup-shaped article 11 in a manner hereinafter described. The insert 83 cooperates with the cavity 82 of the female die member 78 to define an end wall 87 thereof.

The female die member 78 is so constructed and arranged that the flat surface 80 thereof is adapted to cooperate with the flat surface 42 of the die member 37 while the male die member 51 is adapted to be received in the cavity 82 of the female die member 78 with the trim means 53 being receivable in the channel 86 of the female die member 78 for a purpose hereinafter described.

A movable embossing plate 88 is disposed in the cavity 82 of the female die member 78 and has an outer embossing surface 89 cooperable with the embossing surface 55 of the male die member 51 in a manner hereinafter described. The plate 88 is interconnected to a rod 90 passing through a central bore 91 formed in the female die member 78, the rod 90 having an end 92 interconnected to a bar 93 or the like which is adapted to abut stationary support means 94 of the apparatus 10.

The plate 88 is normally held in the position illustrated in FIGURE 4 by a compression spring 95 having one end 96 thereof bearing against the bar 93 and the other end 97 thereof bearing against the female die member 78.

In this manner, the bar 93 of the plate 88 is always held against the stationary members 94 of the apparatus 10 regardless of the movement of the die holder 76 relative to the members 94 for a purpose hereinafter described until the plate 88 abuts the end wall 87 of the female die member 78 whereby the plate 88 is then carried with the female die member 78.

A plurality of bores 98 are formed in circumferentially spaced relation in the female die member 78 and define end walls 99 therewith. The bores 98 are interconnected together by an annular groove 100 formed in the female die member 78.

A suitable conduit 101 is interconnected to the annular groove 100 in the female die member 78 and has a pressure regulator valve 102 therein whereby fluid under pressure is adapted to be delivered from a source (not shown) to the bores 98 through the regulator valve 102 and conduit 101 when the pressure value of the fluid in the bores 98 falls below a predetermined value. Should the pressure value of the fluid in the bores 98 exceed the predetermined value, the regulator valve 102 expels the excess fluid out through an outlet conduit means 103 in a manner well known in the art whereby the pressure regulator valve 102 maintains the fluid pressure in the bores 98 at a substantially predetermined pressure value, such as between 20 and 30 p.s.i.

An annular holding member 104 surrounds the female die member 78 and is adapted to be movable relative to the female die member 78 in a manner hereinafter described, the annular holding member 104 having an outer flat surface 105 which cooperates with the flat surface 36 of the holding member 33 to hold the blank material 12 therebetween in a manner hereinafter described.

A plurality of rods or shafts 106 are connected to the annular holding member 104 and respectively pass through bores 107 formed in the female die member 78 and aligned with the bores 98 thereof. Each rod 106 has a piston 108 on the end thereof respectively disposed in a bore 98 and disposed in sliding and sealing relation therewith by carrying a suitable O ring 109 or the like.

In this manner, the fluid under pressure in the bores 98 acts against the end surfaces 110 of the pistons 108 to force the holding member 104 to the right in the manner illustrated in FIGURE 4. However, the member 104 can be moved to the left relative to the female die member 78 in opposition to the force of the fluid pressure in the bores 98 as the fluid under pressure can be expelled out of the outlet conduit means 103 by the pressure regulator valve 102 to permit such movement of the pistons 108. Should the force being applied to the holding member 104 tending to move the same to the left be withdrawn, the fluid under pressure in the bores 98 acts against the end surfaces 110 of the pistons 108 and cause movement of the member 104 back to the position illustrated in FIGURE 4.

While it is not illustrated in the drawings, it is to be understood that the die holder 76 can be guided toward and away from the bolster 20 by suitable guide rods carried by the bolster 20 and passing through suitable bores in the die holder 76 so that the die holder 76 can move relative to such guide rods upon movement of the press ram 77 toward and away from the bolster 20.

Further, the die apparatus 16 is so constructed and arranged that suitable venting means of the various parts thereof are provided as illustrated in the drawings to prevent locking of the moving parts.

The operation of the die unit 16 will now be described.

When the die members of the die unit 16 are disposed in the position illustrated in FIGURE 4, the strip of blank material 12 is indexed relative to the die unit 16 so that an unblanked portion thereof is moved over the holding member 33 in the manner illustrated in FIGURE 4, the width of the strip 12 being slightly wider than the inside peripheral surface of the holding member 33.

Thereafter, the press ram 77 is moved toward the bolster 20 whereby the holding member 104 and female die member 78 are moved toward the blank 12. As the holding member 104 is moved toward the blank 12, the surface 105 thereof makes contact with the blank 12 and compacts the same against that flat surface 36 of the holding member 33. In this manner, further movement of the holding member 104 to the right is prevented by the stationary holding member 33 whereby the female die member 78 proceeds to move to the right beyond the now stationary holding member 104, movement of the female die member 78 relative to the holding member 104 being permitted by the pistons 108 being telescoped by the bores 98 of the female die member 78.

While the fluid in the bores 98 is being compressed by the female die member 78 moving relative to the pistons 108, the pressure regulator valve 102 prevents the pressure value of the fluid in the bores 98 from exceeding a predetermined pressure value in the manner set forth above. Thus, the fluid under pressure in the bores 98 acts against the pistons 108 to cause the holding member 104 to compact the blank material against the holding member 33 whereby the blank 17 can be subsequently cut from the blank material 12.

As the female die member 78 continues to move to the right beyond the holding member 104, the flat surface 80 thereof makes contact with the strip of blank material 12 disposed against the holding member 33 and compacts the same against the flat surface 42 of the movable die 37. Further movement of the female die member 78 to the right causes movement of the die member 37 to the right whereby the peripheral edge of the flat surface 80 of the female die member 78 cooperates with the inner peripheral edge of the flat surface 36 of the holding member 33 to shear a blank 17 from the strip of blank material 12. Thus, the female die member 78 compacts the blank 17 against the flat surface 42 of the movable die 37 and causes the movable die 37 to move to the right in unison with movement of the female die member 78 to the right.

As the female die member 78 moves to the right from the position illustrated in FIGURE 4, the compression spring 95 holds the bar 93 of the embossing plate 88 against the stationary members 94 of the die unit 16 whereby the movable plate 88 remains stationary as the female die member 78 moves to the right until the plate 88 abuts the end wall 87 of the female die member 78. Thereafter, the plate 88 moves to the right with the moving female die member 78, the embossing plate 88 being disposed against the end wall 87 of the female die member 78 for a purpose hereinafter described.

As the die member 37 is moved to the right under the influence of the female die member 78 being moved to the right, the die member 37 moves the piston 41 to the right whereby the hydraulic fluid displaced in the chamber 63 of the cylinder-defining member 25 by the moving piston 41 acts against the end surface 62 of the piston 60 to thereby cause movement of the male die member 51 to the left. The movement of the male die member 51 to the left forces the central portion of the blank 17 into the cavity 82 of the moving female die member 78.

Figure 5:
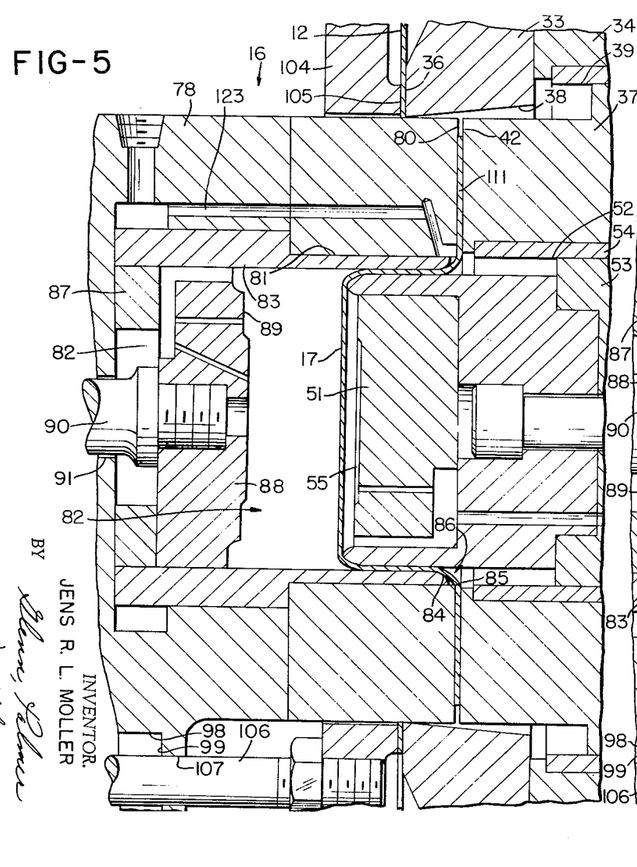
FIGURE 5 is an enlarged, fragmentary, cross-sectional view illustrating various die members of the apparatus of FIGURE 4 in intermediate operating positions thereof.

Thus, it can be seen that while the female die member 78 is moving to the right to carry the blank 17 about the male die member 51, the male die member 51 is also moving to the left drawing the blank 17 into the cavity 82 of the female die members 78 whereby the blank 17 is drawn into a cup-shaped configuration as illustrated in FIGURE 5.

Figure 7:
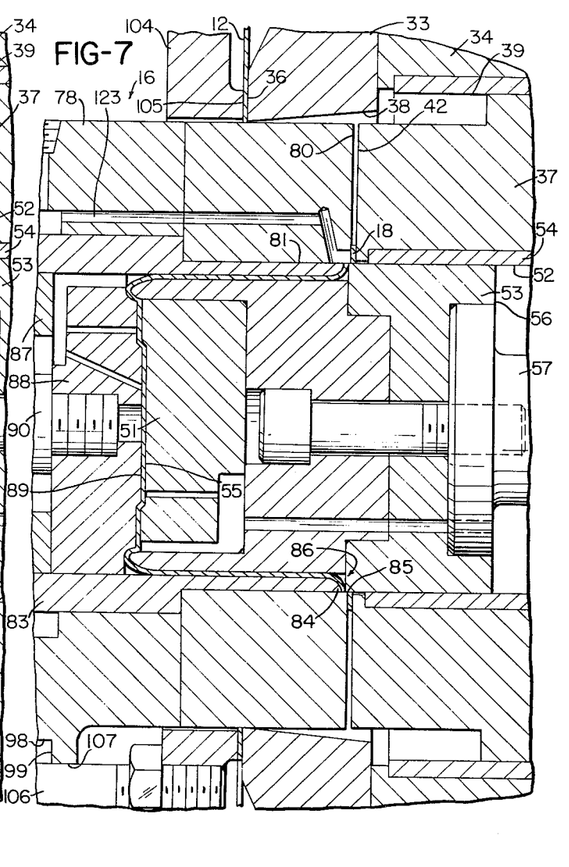
FIGURE 7 is a view similar to FIGURE 5 and illustrates the various die members of the apparatus of FIGURE 4 in their final drawing positions.

As the blank 17 is being drawn into a cup-shaped article as illustrated in FIGURE 5, the peripheral edge 111 of the blank 17 held between the flat surfaces 42 and 80 of the die members 37 and 78 tends to slip therebetween from the position illustrated in FIGURE 5 to the position illustrated in FIGURE 7.

It has been found in the past that as the peripheral edge 111 of the drawn blank 17 slips between the die members 37 and 78, wrinkles appear in the drawn article because sufficient pressure is not exerted between the die members 37 and 78 to hold the peripheral edge 111 in compressed relation.

However, according to the teachings of this invention, not only does the force of the compression spring 64 tend to oppose movement of the piston 60 to the left, but also the force of the fluid under pressure in the chamber 65 tends to oppose movement of the piston 60 to the left whereby the combined forces of the spring 64 and fluid tend to move the piston 60 to the right and thereby cause the fluid in the chamber 63 to act on the end surface 49 of the piston 31 to move the die member 37 to the left in opposition to the force of the die member 78 moving to the right.

Since it has been found that the force of the compressin spring 64 is not sufficient to tend to remove wrinkles formed in the drawn article 11 caused by the peripheral edge 111 of the blank 17 slipping between the die members 37 and 78, the force of the fluid under pressure in the chamber 65 supplied by the conduit means 72 supplements the force of the spring 64 tending to oppose movement of the piston 60 to the left whereby the combined force of the spring 64 and fluid pressure in the chamber 65 tightly compacts the flat surfaces 42 and 80 of the die members 37 and 78 against the peripheral edge 111 of the blank 17 in such a manner that wrinkling of the drawn article 11 is substantially reduced or eliminated.

As the female die member 78 nears the end of its movement to the right, the trim means 53 of the male die member 51 begins to enter the channel 86 of the female die member 78 in the manner illustrated in FIGURE 7 to cooperate with the inner peripheral edge 85 of the flat surface 80 of the female die member 78 to shear the annular ring 18 from the drawn article 11. Such shearing action is permitted by the trim means 53 of the male die member 51 entering the channel 86 defined by the insert 83 of the female die member 78.

When the female die member 78 reaches the end of its stroke to the right as illustrated in FIGURE 7, the embossing plate 88 thereof is disposed against the end wall 87 and the male die member 51 has been moved a distance to the left sufficient to compact the blank 17 against the embossing face 89 of the embossing plate 88 in the manner illustrated in FIGURE 7 whereby the embossing surfaces 55 and 89 of the male die member 51 and embossing plate 88 fully emboss the closed bottom 11a of the drawn article 11 in the manner illustrated in FIGURE 7.

Thus, it can be seen that not only does the die unit 16 cut a blank 17 from the strip of blank material 12 and form the blank 17 into a cup-shaped article but the die unit 16 also trims the annular flange 11b of the cup-shaped article 11 and embosses the closed end 11a thereof, features heretofore unknown in double-acting die apparatus.

The reason why the die units 16 of this invention are adapted to trim the annular flanges 11b and emboss the closed ends 11a of the cup-shaped articles 11 produced thereby is because the strokes of the male die members 51 to the left are always constant in relation to predetermined strokes of the female die members 78 to the right.

If the stroke of the male die member 51 was not constant, as in the prior art, the male die member 51 would at times have a longer stroke whereby great interference would be created between the male die member 51 and the embossing plate 88 which would cause excessive damage to the die unit 16. Further, if the stroke of the male die member 51 were greater at times, the trim means 53 thereof would be forced against the insert 83 of the female die members 78 whereby excessive damage would be caused to the members 53 and 83.

One reason why each of the prior known double-acting die apparatus do not produce a uniform stroke of the male die member thereof in relation to a predetermined stroke of the female die member is because the hydaulic fluid in the chamber 63 tends to heat up as the die unit 16 is operated for a period of time. The heated hydraulic fluid in the chamber 63 expands in volume thereby displacing the piston 60 of the male die member 51 to the left to compensate for such increase in volume. Thereafter, when the female die member 78 was moved through its predetermined stroke, the male die member 51 was moved through its predetermined stroke but since the male die member 51 already started at a point further to the left than before, the combined travel of the piston 51 to the left was greater than when the hydraulic fluid was at a smaller volume.

Thus, the prior-known, double-acting die apparatus produces progressively deeper cup-shaped articles as the apparatus continues to work. Therefore, the first produced articles would be shallow in comparison to the later drawn articles because of the increase in volume of the hydraulic fluid in the chamber 63.

Accordingly, the prior-known, double-acting die apparatus can not emboss the closed ends of the cup-shaped articles and can not trim the annular flanges of the same because the strokes of the male die members thereof can not be controlled to predetermined strokes as in the present invention.

One means of this invention for maintaining a stroke of the male die member 51 constant throughout the entire operating conditions of the die unit 16 is illustrated in FIGURES 4 and 9 and comprises a hydraulic system which maintains the volume of the hydraulic fluid in the chamber 63 at a substantially predetermined volume regardless of the temperature of the hydraulic fluid.

In particular, a reservoir 112 is provided which contains a supply 113 of hydraulic fluid utilized in the chamber 63 of the die unit 16.

A passage means 114 is formed in the end plate 30 of the cylinder-defining means 25 and interconnects the exterior thereof with the chamber 63. The passage means 114 is interconnected to an outlet conduit means 115 leading to the reservoir 112, the outlet conduit means 115 having a pressure regulator valve 16 and a one-way check valve 117 disposed therein.

The regulator valve 116 is so constructed and arranged that when the hydraulic fluid 113 in the chamber 63 heats up and thereby increases in volume, the pressure value of the fluid 113 in the chamber 63 increases, whereby the regulator valve 116 senses the increase in pressure value and opens to interconnect the chamber 63 with the reservoir 112 so that the expanding hydaulic fluid 113 in the chamber 63 is interconnected to the reservoir 112. In this manner, the pressure regulator valve 116 prevents the hydraulic fluid 113 in the chamber 63 from exceeding a predetermined volume.

Conversely, in order to prevent the pressure value of the hydraulic fluid 113 in the chamber 63 of the die unit 16 from falling below a predetermined pressure value by having the volume thereof fall below the predetermined volume upon cooling of the fluid 113, the reservoir 112 is interconnected to the chamber 63 by an inlet conduit means 118 having a one-way check valve 119 disposed therein and interconnected to a passage means 120 leading to the chamber 63.

Thus, should the pressure value of the hydraulic fluid 113 in the chamber 63 fall below the predetermined pressure value, because the volume thereof has fallen below a predetermined volume, the check valve 119 opens and permits the fluid 113 in the reservoir 112 to flow to the chamber 63 to maintain the same at a constant volume.

In order to cause the hydraulic fluid 113 in the reservoir 112 to flow to the chamber 63 in the manner previously described, the hydraulic fluid 113 in the reservoir 112 is maintained under pressure by having compressed air or the like imposed on the upper surface thereof, the compressed air being fed to the reservoir 112 by an inlet conduit means 121 having a one-way check valve 122 disposed therein.

Therefore, it can be seen that since the volume of hydraulic fluid in the chamber 63 of the cylinder-defining member 25 remains constant throughout the entire operating conditions of the die unit 16, the male die member 51 will always be disposed at the position illustrated in FIGURE 4 before each drawing operation so that the stroke of the male die member 51 will always be the same into the cavity 82 of the female die member 78 whereby the male die member 51 is not only adapted to trim the drawn article 11 by the trim means 53 thereof but is also adapted to emboss the closed end of the cup-shaped article 11 by compacting the same against the embossing plate 88.

As previously stated, the prior-known double-acting die apparatus are not adapted to emboss the closed ends of the cup-shaped articles drawn thereby, because there is no way to control the strokes of the male die members into the cavities of the female die members. Therefore, an additional production step and an additional embossing apparatus have to be provided when the prior-known apparatus are utilized. Further, the articles produced by the prior-known methods and apparatus are not uniform, whereby some means must be provided in the additional embossing apparatus to compensate for this irregularity. However, by following the teachings of this invention, not only is each of the cup-shaped articles 11 drawn to the same extent by the apparatus of this invention, but also each of the cup-shaped articles 11 has the closed end 11a thereof embossed to a uniform degree by the same apparatus, thereby not only saving in production costs but also saving in the initial cost of the machinery needed to produce such articles 11 over the prior-known methods and apparatus.

Further, because of variations in the material of the blank 17, whether drawn by the apparatus of this invention or prior-known apparatus, irregularities appear at the peripheral edge 111 of the drawn blank 17 which must be subsequently trimmed away to provide a uniform annular flange 11b about the open end of the drawn article 11. Not only does the prior-known apparatus not have any means for performing such trimming operation, whereby additional production steps and apparatus must be provided, but also the circular blanks utilized therein must be over-sized in order to compensate for the variations in the depths of the cup-shaped articles drawn thereby. For example, in order to provide sufficient material at the peripheral edge of the drawn article to permit subsequent trimming thereof when the prior-known apparatus provides a deep cup-shaped article, each blank 17 provided for the prior-known apparatus must be of a size to form a deep cup-shaped article, whether the apparatus is forming deep cup-shaped articles at that time or shallow cup-shaped articles. Therefore, when the prior-known apparatus are forming shallow cup-shaped articles, an excessive amount of waste material is trimmed therefrom to provide uniform annular flanges 11b at the open ends of the drawn articles 11.

However, by following the teachings of this invention, each blank 17 provided for the apparatus 16 can be only of the desired size to produce a uniform cup-shaped article without providing excess material for a deeper article, whereby less blank material is wasted by the apparatus and methods of this invention than is wasted by prior-known apparatus and methods. Further, the apparatus of this invention performs a trimming operation subsequent to the drawing operation, whereby no additional apparatus or manufacturing opeartions are required to produce the uniform annular flange 11b at the open end of the cup-shaped article 11.

After the die unit 16 has performed its drawing operation in the above manner, the press ram 77 of the die unit 16 is moved back to the left whereby the female die member 78 is moved away from the bolster 20.

As the female die member 78 is moved to the left, the force of the compression spring 64 acting against the piston 60 is sufficient to cause the piston 60 to move to the right whereby the hydraulic fluid displaced in the chamber 63 acts against the end surface 49 of the piston 44 to move the piston 41 back to the left whereby the male die member 51 is moved to the right and the die member 37 is moved to the left to the positions illustrated in FIGURE 4.

As the female die member 78 is moved back to the left, the bar 93 of the embossing plate 88 subsequently abuts the stationary members 94 of the die unit 16 whereby further movement of the female die member 78 to the left causes the embossing plate 88 to push the drawn article 11 out of the cavity 82 thereof in the manner illustrated in FIGURE 8. Thus, the article 11 is ejected from the cavity 82 of the female die member 78 when the female die member 78 is disposed in the position illustrated in FIGURE 8.

The ejected drawn article 11 and cut ring 18 fall by gravity onto the conveyor 19 as illustrated in FIGURE 1 whereby the same can be conveyed away from the apparatus 10 to any desired location and the die unit 16 is adapted to perform another drawing operation in the same manner.

If desired, the trimmed ring 18 can be ejected from the apparatus 16 by a suitable jet of air, such as provided by passage means 123 in the female die member 78.

When the female die member 78 is moved back to the left by the press ram 77, the holding member 104 is disposed in a position illustrated in FIGURE 4 by the compressed fluid in the bores 98 acting against the ends 110 of the pistons 108.

Thus, it can be seen that each die unit 16 of this invention not only produces uniform cup-shaped articles 11 but also the same trims the annular rim 11b thereof and embosses the closed end 11a in a manner heretofore unattainable by prior-known, double-acting die apparatus. Further, the cup-shaped articles 11 of this invention have been found to have the annular flanges 11b thereof substantially wrinkle free because of the combined action of the compression spring 64 and the hydraulic fluid in the chamber 65 thereof utilized in a manner heretofore described.

Therefore, it can be seen that each of the die units of this invention is not only adapted to form uniform cup-shaped articles throughout continued use and any operating conditions of the unit but the same is also adapted to emboss the closed ends of the cup-shaped articles as well as trim the annular peripheral edges thereof.

Figures 10, 11:
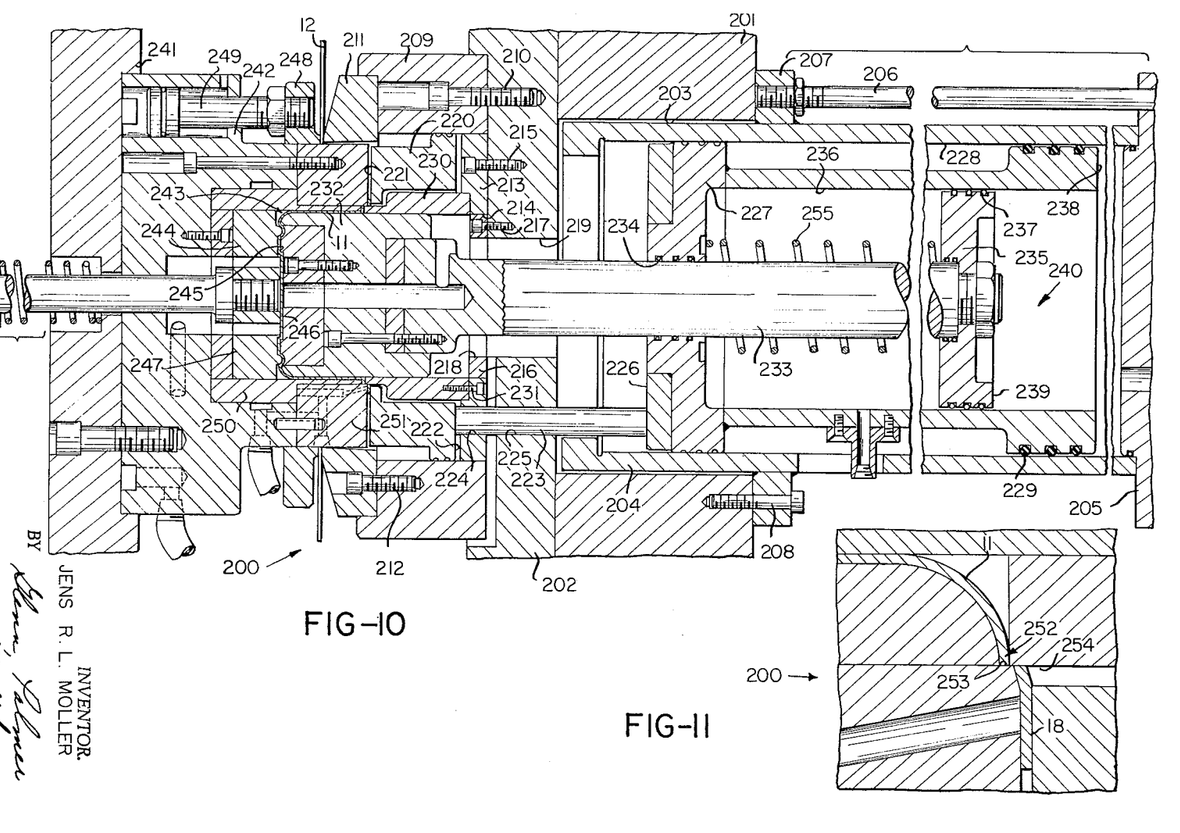
FIGURE 10 is a view similar to FIGURE 6 and illustrates another embodiment of this invention.
FIGURE 11 is an enlarged, fragmentary cross-sectional view of the trimming means of the apparatus of FIGURE 10.

Another die unit of this invention is generally indicated by the reference numeral 200 in FIGURES 10 and 11 and is adapted to not only form uniform cup-shaped articles 11 throughout continued use and any operating conditions of the unit, but also is adapted to emboss the closed ends of the cup-shaped articles as well as trim the annular peripheral edges thereof.

In particular, the die unit 200 comprises a bolster 201 having a die holder 202 secured in any suitable manner to one side of the bolster 201. The bolster 201 has a bore 203 passing therethrough and receiving a substantially cylindrical cylinder-defining member 204 having the free end thereof closed by a cover means 205 secured to the bolster 201 by a plurality of bolts 206 being threadedly received in an annular member 207 welded or otherwise fastened to the cylinder defining member 204 and secured to the bolster 201 by a plurality of threaded fastening members 208.

An annular member 209 is secured to the left hand side of the die holder 202 by a plurality of threaded fastening members 210, the annular member 209 carrying an annular holding member 211 secured thereto by a plurality of threaded fastening members 212.

A plate 213, having a central bore 214 passing therethrough, is disposed inside the annular member 209 and is secured to the die holder 202 by a plurality of threaded fastening members 215.

Another flat plate is disposed in the bore 214 of the plate 213 and is secured to the die holder 202 by a plurality of threaded fastening members 217, the plate 216 having a bore 218 passing therethrough and aligned with a bore 219 passing through the die holder 202.

A movable die member 220 is disposed in the annular member 209 and is adapted to move axially between the plate 213 and the holding member 211, the movable die member 220 having an outer surface 221 for a purpose hereinafter described.

The other surface 222 of the movable die member 220 engages the adjacent ends of a plurality of rods 223 respectively disposed in bores 224 and 225 formed in the plate 213 and die holder 202 and engaging one end 226 of a movable piston member 227 disposed in sliding and sealing relation with the internal wall 228 of the cylinder-defining member 204 by a plurality of sealing means 229.

In this manner movement of the piston member 227 to the left causes the die member 220 to move to the left while movement of the die member 220 to the right in a manner hereinafter described causes like movement of the piston member 227 to the right.

An annular trimming member 230 is disposed inside the movable die member 220 and is secured to the plate 213 by a plurality of threaded fastening members 231, the trimming member 230 being utilized in a manner hereinafter described.

A movable male die member 232 is disposed for axial movement inside of the trim member 230, the male die member 231 being interconnected to a shaft or rod 233 passing through a bore 234 formed in the end 226 of the piston member 237.

The free end of the rod 233 is interconnected to a piston member 235 disposed in sliding and sealing engagement against the internal peripheral surface 236 of the piston member 227 by a plurality of sealing means 237.

The end surfaces 238 and 239 of the piston members 227 and 235 cooperate together with the cylinder defining member 204 and cover means 205 to define a chamber 240 which receives hydraulic fluid by a system similar to the die unit 16 previously described.

Thus, when the movable die member 220 is moved to the right, the fluid displaced in the chamber 240 by the end of the moving piston 238 acts against the end surface 239 of the piston 235 to move the male die member 232 to the left to perform the drawing operation later to be described.

Another die holder 241 is carried by the die unit 200 and is movable toward and away from the bolster 201 by suitable ram press means or the like, the die holder 241 carrying a female die member 242 having a cavity 243 which cooperates with the male die member 232 to form the cup-shaped articles 11.

A movable plate 244 is disposed in the cavity 243 of the female die member 242 and has an embossing surface 245 which cooperates with an embossing surface 246 of the male die member 232 to emboss the closed end of a cup-shaped article 11 when the plate 244 is moved against the end wall 247 of the cavity 243 in the manner previously described.

An annular holding member 248 surrounds the female die member 242 and is interconnected thereto by a plurality of pistons 249 which operate in substantially the same manner as the pistons 106 previously described.

The cavity 243 of the female die member 242 is lined by a member 250 which cooperates with an annular member 251 secured to the female die member 242 to define a channel 252 to receive the trim means 230 when the die members 232 and 242 are disposed in the position illustrated in FIGURES 10 and 11.

In particular, the member 251, carried by the female die member 242, has a surface 253 which cooperates with the adjacent surface 254 of the trim means 230 to shear the cup-shaped article 11 at the outer peripheral edge thereof and form the aforementioned annular trimming 18.

The operation of the die unit 200 will now be described.

When the die holder 241 is moved away from the bolster 201, the surface 246 of the male die member 232 and the surface 221 of the movable die member 220 are disposed in the same plane which passes over the left hand surface of the holding member 211.

The sheet of material 12 is indexed relative to the die unit 200 until an unblanked portion thereof is disposed over the holding member 211.

Thereafter, the die holder 241 is moved toward the bolster 201 whereby the holding member 248 comes into contact with the sheet 12 and holds the same against the holding member 211 while the female die member 242 continues to move to the right beyond the holding member 248 to cause the annular member 251 to cooperate with the holding member 211 and shear a substantially circular blank from the sheet of material 12.

As the female die member 242 moves to the right, the annular member 251 compacts the severed blank against the surface 221 of the movable die member 220 and causes the movable die member 220 to move to the right in unison with the female die member 242 whereby the piston 227 moves to the right and causes the piston 235 to move to the left. As the piston 235 moves to the left, the male die member 232 is moved to the left in unison therewith and draws the blank of material into the cavity 243 of the female die member 242 moving to the right until the male die member 232 compacts the cup-shaped article 11 against the embossing surface 245 of the movable plate 244 abutting the end surface 247 of the female die member 242.

As the cup-shaped article 11 is being embossed in the above manner, the trim means 230 is received into the recess 252 to trim the ring 18 from the peripheral edge of the cup-shaped article 11.

Thereafter, the die holder 241 is moved away from the bolster 201 whereby a compression spring 255 disposed between the end 226 of the piston member 227 and the piston member 235 causes the male die member 232 to move back to the right and thereby cause movement of the movable die member 220 back to the left whereby the die members 232 and 220 are again disposed in the initial position thereof, the cup-shaped article 11 being dispensed from the cavity 243 of the female die member 242 by the movable plate 244 in a manner similar to the movable plate 88 previously described.

Therefore, it can be seen that another die unit is provided by this invention which is not only adapted to form uniform cup-shaped articles throughout continued use and any operating conditions of the unit because the male die member 232 and female die member 242 have uniform strokes, but is also adapted to emboss the closed ends of the cup-shaped articles as well as trim the annular peripheral edges thereof.

While the form of the invention now preferred has been disclosed as required by the statutes, other forms may be used, all coming within the scope of the claims which follow.

What is claimed is:

1. In combination, support means, a cylinder-defining means carried by said support means, a first movable die member carried by said support means and having a piston portion disposed in said cylinder-defining means, a second movable die member carried by said support means and having a piston portion disposed in said cylinder-defining means, fluid means disposed in said cylinder-defining means, said fluid means causing movement of said first die member in one direction relative to said support means when said second die member is moved in the opposite direction relative to said support means, and means for maintaining said fluid means at a constant volume regardless of the temperature thereof to assure that said first die member will be disposed at a predetermined distance relative to said support means when said second die member is moved in said opposite direction a predetermined distance relative to said support means.

2. A combination as set forth in claim 1 wherein trim means is carried by said first die member.

3. A combination as set forth in claim 1 wherein said means for maintaining said fluid means at a constant volume comprises a reservoir containing a supply of said fluid under pressure, one-way means for interconnecting said cylinder-defining means with said reservoir when said fluid in said cylinder exceeds a predetermined volume, and one-way means interconnecting said reservoir with said cylinder-defining means when said fluid in said cylinder falls below said predetermined volume.

4. In combination, support means, a first movable die member carried by said support means, a second movable die member carried by said support means and surrounding said first die member, trim means carried by said first die member and movable in unison therewith, and a third movable die member carried by said support means and movable toward and away from said first die member, said third die member having a surface for engaging said second die member, said surface of said third die member having a channel-defining means for receiving said trim means to trim a blank disposed between said third die member and said first and second die members and drawn thereby.

5. In combination, support means, a first movable die member carried by said support means, a second movable die member carried by said support means and surrounding said first die member, trim means carried by said first die member and movable in unison therewith, and a third movable die member carried by said support means and cooperable with said first and second die members to draw a blank disposed therebetween into a selected configuration, said third die member cooperating with said trim means to trim said drawn blank.

6. In combination, support means, a first movable die member carried by said support means, a second movable die member carried by said support means, trim means carried by said first die member and movable in unison therewith, a third movable die member carried by said support means and movable toward and away from said first die member, said third die member having a surface engageable with said second die member to cause movement of said second die member in one direction when said third die member is moved in said one direction, said third die member having a cavity for receiving said first die member, and means operatively interconnecting said first and second die members together to cause said first and second die members to move in opposite directions when said second die member is moved in said one direction by said third die member to cause said first die member to be received in said cavity of said third die member.

7. In combination, support means, a bolster carried by said support means, a first movable die member carried by said bolster, a second movable die member carried by said bolster and surrounding said first die member, trim means carried by said first die member and movable in unison therewith, a first holding member carried by said bolster and surrounding said second die member, a die holder carried by said support means and movable toward and away from said bolster, a third die member carried by said die holder and having a surface interrupted by cavity means, a second holding member carried by said die holder and surrounding said third die member, means operatively interconnecting said first and second die members together to cause said first and second die members to move in opposite directions when said second die member is moved in a particular direction relative to said bolster, and means for moving said die holder toward said bolster to cause said holding members to hold blank material therebetween while said third die member moves said second die member therewith to cut a blank from said blank material and draw said blank by said first die member being received in said cavity of said third die member, said surface of said third die member subsequently cooperating with said trim means to trim said drawn blank.

8. In combination, support means, a first movable die member carried by said support means, a second movable die member carried by said support means and surrounding said first die member, means operatively interconnecting said first and second die members to cause said first die member to move a predetermined distance relative to said support means when said second die member is moved a predetermined distance relative to said support means in the opposite direction, a movable die holder carried by said support means and movable toward and away from said first die member, a third die member carried by said die holder and having a surface interrupted by a cavity, said cavity having an end wall disposed remote from said surface, a movable plate carried by said die holder and disposed in said cavity of said third die member, and means for moving said die holder toward said first die member to cause said surface of said third die member to engage said second die member and carry said second die member therewith said predetermined distance whereby said first die member is moved said predetermined distance into said cavity and compacts said movable plate against said end wall of said cavity of said third die member, said means operatively interconnecting said first and second die members to cause said first die member to move a predetermined distance relative to said support means when said second die member is moved a predetermined distance relative to said support means in the opposite direction comprising a cylinder defining means carried by said support means, a piston portion carried by said first die member and disposed in said cylinder defining means, a piston portion carried by said second die member and disposed in said cylinder defining means, fluid means disposed in said cylinder defining means, said fluid means causing movement of said first die member in one direction relative to said support means when said die member is moved in the opposite direction relative to said support means, and means for maintaining said fluid means at a constant volume regardless of the temperature thereof to assure that said first die member will be disposed at a predetermined distance relative to said support means when said second die member is moved in said opposite direction a predetermined distance relative to said support means.

9. A combination as set forth in claim 8 wherein said movable plate and said first die member are adapted to emboss an article disposed therebetween.

10. In combination, support means, a first movable die member carried by said support means, a second movable die member carried by said support means, means operatively interconnecting said first and second die members to cause said first die member to move a predetermined distance relative to said support means when said second die member is moved a predetermined distance relative to said support means in the opposite direction, a movable die holder carried by said support means and movable toward and away from said first die member, a third die member carried by said die holder and fluid pressure having a surface engageable with said second die member, said third die member having a cavity, and means for moving said die holder toward said first die member to cause said surface of said third die member to engage said second die member and carry said second die member therewith said predetermined distance whereby said first die member is moved said predetermined distance to permit said first die member to be received into said cavity of said third die member and emboss the closed end of a cup-shaped article drawn between said first and third die members, said means operatively interconnecting said first and second die members to cause said first die member to move a predetermined distance relative to said support means when said second die member is moved a predetermined distance relative to said support means in the opposite direction comprising a cylinder defining means carried by said support means, a piston portion carried by said first die member and being disposed in said cylinder defining means, a piston portion carried by said second die member and disposed in said cylinder defining means, fluid means disposed in said cylinder defining means, said fluid means causing movement of said first die member in one direction relative to said support means when said second die member is moved in the opposite direction relative to said support means, and means for maintaining said fluid means at a constant volume regardless of the temperature thereof to assure that said first die member will be disposed at a predetermined distance relative to said support means when said second die member is moved in said opposite direction a predetermined distance relative to said support means.

11. In combination, support means, a cylinder-defining means carried by said support means, a first movable die member carried by said support means and having a piston disposed in said cylinder-defining means, a second movable die member carried by said support means and having a piston disposed in said cylinder-defining means, said pistons of said die members cooperating together to divide said cylinder-defining means into two chambers, fluid means disposed in one of said chambers to cause said first die member to move in one direction when said second die member is moved in the opposite direction, means for maintaining said fluid means at a constant volume regardless of the temperature thereof to assure that said first die member will be disposed at a predetermined distance relative to said support means when said second die member is moved in said opposite direction a predetermined distance relative to said support means and means disposed in the other chamber to tend to maintain said die members in predetermined positions relative to each other.

12. A combination as set forth in claim 11 wherein said other chamber is defined solely by said pistons.

13. A double-acting die apparatus for forming a cup-shaped article having an outwardly directed flange surrounding the open end thereof and comprising support means, a movable male die member carried by said support means, a movable female die member carried by said support means, means operatively interconnecting said die members together to cause said male die member to move toward said female die member while said female die member is moving toward said male die member to form said cup-shaped article therebetween, and trim means carried by one of said die members to be movable in unison therewith and cooperable with the other die member to trim said flange of said article.

14. In combination, support means, a first movable die member carried by said support means, a second movable die member carried by said support means and surrounding said first die member, stationary trim means carried by said support means and disposed between said first and second die members, and a third movable die member carried by said support means and movable toward and away from said first die member, said third die member having a surface for engaging said second die member, said surface of said third die member having a channel-defining means for receiving said trim means to trim a blank disposed between said third die member and said first and second die members and drawn thereby.

15. In combination, support means, a first movable die member carried by said support means, a second movable die member carried by said support means and surrounding said first die member, stationary trim means carried by said support means and disposed between said first and second die members, and a third movable die member carried by said support means and cooperable with said first and second die members to draw a blank disposed therebetween into a selected configuration, said third die member cooperating with said trim means to trim said drawn blank.

16. In combination, support means, a first movable die member carried by said support means, a second movable die means carried by said support means, stationary trim means carried by said support means, a third movable die member carried by said support means and movable toward and away from said first die member, said thrid die member having a surface engageable with said second die member to cause movement of said second die member in one direction when said third die is moved in said one direction, one of said pair of said first and third die members having a cavity for receiving the other die member of said pair, and means operatively interconnecting said first and second die members together to cause said first and second die members to move in opposite directions when said second die member is moved in said one direction by said third die member to cause said other die member of said pair of die members to be received in said cavity of said one die member.

17. In combination, support means, a bolster carried by said support means, a first movable die member carried by said bolster, a second movable die member carried by said bolster and surrounding said first die member, stationary trim means carried by said bolster and disposed between said first and second die members, a first holding member carried by said bolster and surrounding said second die member, a die holder carried by said support means and movable toward and away from said bolster, a third die carried by said die holder and having a surface interrupted by cavity means, a second holding member carried by said die holder and surrounding said third die member, means operatively interconnecting said first and second die members together to cause said first and second die members to move in opposite directions when said second die member is moved in a particular direction relative to said bolster, and means for moving said die holder toward said bolster to cause said holding members to hold blank material therebetween while said third die member moves said second die member therewith to cut a blank from said blank material and draw said blank material by said first die member being received in said cavity of said third die member, said surface of said third die member subsequently cooperating with said trim means to trim said drawn blank.

18. A double-acting die apparatus for forming a cup-shaped article having an outwardly directed flange surrounding the open end thereof and comprising support means, a movable male die member carried by said support means, a movable female die member carried by said support means, means operatively interconnecting said die members together to cause said male die member to move toward said female die member while said female die member is moving toward said male die member to form said cup-shaped article therebetween, and stationary trim means carried by said support means for trimming said flange of said article.

19. A drawing apparatus comprising support means, a first movable die member carried by said support means, a second movable die member carried by said support means and surrounding said first die member, trim means carried by one of said support means and said first die member intermediate said first die member and said second die member, and a third movable die member carried by said support means and cooperable with said first and second die members to draw a blank disposed therebetween into a selected configuration, said third die member cooperating with said trim means to trim said drawn blank.

References Cited by the Examiner
UNITED STATES PATENTS

| | | | |
|---|---|---|---|
| 1,884,700 | 10/1932 | Hothersall | 113—46 |
| 2,075,847 | 4/1937 | Hothersall | 113—46 |
| 2,294,676 | 9/1942 | MacMillin et al. | 113—46 |
| 2,417,794 | 3/1947 | Werner | 113—46 |
| 2,609,775 | 9/1952 | Gaudreau | 113—46 |
| 2,985,128 | 5/1961 | Henrickson | 113—42 |
| 2,998,238 | 8/1961 | Kenline | 113—46 |
| 3,034,466 | 5/1962 | Brandes | 113—42 |

CHARLES W. LANHAM, *Primary Examiner.*